United States Patent [19]

Heidlas et al.

[11] Patent Number: 5,616,359
[45] Date of Patent: Apr. 1, 1997

[54] PROCESS FOR THE PRODUCTION OF EGG-BASED PRODUCTS IN A POWDER FORM WITH A REDUCED FAT AND CHOLESTEROL CONTENT

[75] Inventors: Jürgen Heidlas, Trostberg; Jan Cully, Garching; Heinz-Rüdiger Vollbrecht, Altenmarkt, all of Germany

[73] Assignee: SKW Trostberg Aktiengesellschaft, Trostberg, Germany

[21] Appl. No.: 524,159

[22] Filed: Aug. 31, 1995

Related U.S. Application Data

[63] Continuation of Ser. No. 213,659, Mar. 15, 1994, abandoned.

[30] Foreign Application Priority Data

Mar. 15, 1993 [DE] Germany ............... 43 07 979.2

[51] Int. Cl.$^6$ ..................................... A23L 1/32
[52] U.S. Cl. ..................... 426/614; 476/425; 476/429; 554/206
[58] Field of Search ................. 426/614, 641, 426/644, 601, 603, 608, 417, 312, 425, 429; 554/206

[56] References Cited

U.S. PATENT DOCUMENTS 5,041,245  8/1991  Benado .
5,061,505  10/1991  Cully et al. ..................... 426/614
5,091,117  2/1992  Athnasios et al. ............... 426/586
5,238,694  8/1993  Ogasahara et al. .............. 426/614
5,288,619  2/1994  Brown et al. .................... 426/601
5,446,842  11/1995  Heidlas et al. ................... 426/614

FOREIGN PATENT DOCUMENTS 41723      2/1985  Germany .
59-135847  8/1984  Japan ............................. 426/614
9002788    3/1990  WIPO .

OTHER PUBLICATIONS

Abstract Produced by International Food Information Services (FSTA) for EP 41723, 1986. Accession No. 86(07):VO16S.

Moates, G., et al., Food Science and Technology Today 4:213–214 (1990).

Primary Examiner—Anthony J. Weier
Attorney, Agent, or Firm—Felfe & Lynch

[57] ABSTRACT

A process is described for the production of egg-based products in powder form with a reduced fat and cholesterol content in which the starting material in powder form is extracted with liquid propane at a pressure of $\leq 200$ bar and at a temperature of $\leq 70°$ C. In this way low-cholesterol and low-fat egg powder products with good sensory properties are produced without the phospholipids and in particular lecithin being removed to a substantial extent in this process.

8 Claims, No Drawings

PROCESS FOR THE PRODUCTION OF EGG-BASED PRODUCTS IN A POWDER FORM WITH A REDUCED FAT AND CHOLESTEROL CONTENT

This application is a continuation, of application Ser. No. 08/213,659, filed Mar. 15, 1994, now abandoned.

The invention concerns a process for the production of egg-based products in powder form with a reduced fat and cholesterol content which have essentially the same functional properties as the starting material.

Cholesterol and cholesterol esters (hereinafter "cholesterol derivatives") are lipophilic substances which are present in numerous important foods of animal origin such as, e.g., egg yolk, meat, animal fats, etc.

It is well-known that the dietary intake of fat and cholesterol in amounts which are too high represents an increased risk factor for arteriosclerosis and coronary heart disease.

For this reason, the food industry has endeavoured to significantly reduce fats and cholesterol derivatives in high-fat foods of animal origin.

A major difficulty in this concern is to substantially preserve the sensory and nutritional-physiological properties of the foods.

With regard to cholesterol reduction, a number of processes for the isolation of cholesterol derivatives is indeed already known. However, due to chemical changes of important constituents of the starting material (such as, e.g., denaturation of proteins) these methods are not suitable for reducing the content of cholesterol in foods.

A relatively mild process which has only recently become known utilizes $CO_2$ high pressure extraction for the removal of cholesterol derivatives (cf. V. Krukonis, Supercritical Fluid Processing, International Symposium on Supercritical Fluids, Nice, 1988 and A. Bude and D. Knorr, Reduction of Cholesterol in Egg Powder and Whole Eggs by Extraction with Supercritical Carbon Dioxide, Fifth International Congress of Engineering and Food, Cologne, 1989).

In DE-OS 39 29 555, it is suggested that in order to remove cholesterol derivatives, the food in question is first treated with compressed $CO_2$ during which lipophilic substances such as, e.g., triglycerides, phospholipids, dyes, etc. are also co-extracted in addition to cholesterol derivatives. The cholesterol derivatives are removed from the $CO_2$ stream by subsequent adsorption or adduct formation and this is again returned over the extraction material with lipophilic components.

A disadvantage of the $CO_2$ process is the fact that relatively large amounts of gas and comparatively high pressures, which are usually at >200 bar, are necessary in order to achieve an appropriate charging of the gas with lipid substances. This is why application on a large industrial scale is very often uneconomical due to extremely high plant costs.

It is known that compressed propane can be used as an extraction medium for fats and oils (e.g., U.S. Pat. No. 2,560,935, U.S. Pat. No. 4,331,695 as well as DE-PS 23 63 418). In this process, a high content of lipids in the medium is indeed achieved in a comparatively low pressure range. However, a disadvantage of the propane extraction is regarded as the low selectivity for the various lipophilic constituents.

Thus triglycerides, cholesterol derivatives and also phospholipids as isolated individual components are very readily dissolved in compressed propane. Since, however, phospholipids such as, e.g., lecithin represent valuable constituents of the egg products due to their nutritional-physiological and functional properties, it must be regarded as a disadvantage when these substances are removed to a substantial extent. A process which makes economic sense for the production of egg products with a reduced content of fat and cholesterol and with a relatively high content of phosholipids in one extraction step has not been known previously.

The object of the invention is therefore to develop a process for the production of egg-based powder products with a reduced fat and cholesterol content by treatment with compressed gases which does not have the said disadvantages of the prior art but allows the substantial reduction of the fats and cholesterol derivatives in egg products in a technically uncomplicated process without there being a substantial removal of phospholipids, and in particular, lecithin.

This object is achieved according to the invention by extracting the starting material in powder form with liquid propane at a pressure of $\leq 200$ bar and a temperature of $\leq 70°$ C. It has surprisingly turned out that when these extraction conditions are adhered to, a selective removal of fats and cholesterol derivatives is achieved while the phospholipids largely remain in the egg product so that the functional properties of the starting material are preserved in the product.

Egg-based products in powder form such as, e.g., egg yolk powder or whole egg powder or products which contain these materials are used for the process according to the invention. An essential feature of the invention is that the extraction is carried out with propane in a liquid state at a pressure of $\leq 200$ bar and at a temperature of $\leq 70°$ C. The lower limit of the usable range for pressure and temperature is determined by the requirement that the propane must be liquid. This ensures that the lecithin or the phospholipids only partially dissolve in the liquid propane whereas the solubility of the fat and cholesterol derivatives remains just as good so that these substances can be almost completely extracted.

Due to the sensitive properties of the further constituents of egg products and in particular of the proteins, the extraction is preferably carried out in a pressure range of 10 to 60 bar and at an extraction temperature between 20° and 60° C. and in particular 25° to 50° C. In this way a denaturation of the proteins is avoided. The amount of propane used can be varied within wide limits and essentially depends on the amount of fats and cholesterol derivatives which are to be removed. As a rule 1 to 30 kg per kg starting material is usually sufficient to achieve a satisfactory reduction of the constituents which are to be removed. Within the scope of the invention it is also possible to use the propane in a mixture with up to 45% by weight butane.

Following the extraction, the fats and cholesterol derivatives or the residual phospholipids dissolved in the liquid propane can then be separated from the propane by evaporation and/or reduction in pressure. The propane gas can then again be used for the extraction of the egg products after liquefaction so that a small amount of propane can be continuously circulated and consequently the economic efficiency of the process can be considerably increased.

It is also possible within the scope of the invention to only partially extract the fats from the egg products by variation of the extraction conditions if this is desired for particular reasons. Thus, the ratio of fats to cholesterol derivatives can be specifically controlled by variation of the extraction pressure, the extraction temperature as well as the amount of propane which additionally increases the effectiveness of the process.

The process according to the invention can also be used to produce egg-based products in a powder form with a reduced content of cholesterol and fat and with good sensory properties whose cholesterol and fat content is reduced by more than 85% whereby at least 50% of the phospholipids of the starting material are preserved.

The following examples are intended to elucidate the invention in more detail.

EXAMPLE 1

30 kg liquid propane is passed through 1000 g egg yolk powder (total lipids: 60% by weight; fat: 45% by weight; phospholipids: 15% by Weight; total cholesterol: 2.1% by weight) for 2 hours at 20 bar and 25° C. in a 4 1 pressure autoclave. The process is carried out in a circulation in which the extract separation is achieved by evaporation of the propane in a separator. The extraction residue (530 g) was analysed: total lipids: 24.5% by weight; fat: 5% by weight; phospholipids: 19.5% by weight; total cholesterol: 0.07% by weight.

EXAMPLE 2

20 kg liquid propane is passed through 1000 g egg yolk powder (total lipids: 60% by weight; fat: 45% by weight; phospholipids: 15% by weight; total cholesterol: 2.1% by weight) for 80 minutes at 20 bar and 45° C. in a 4 1 pressure autoclave. The process is carried out in a circulation in which the extract separation is achieved by evaporation of the propane in a separator. The extraction residue (523 g) was analysed: total lipids: 23.6% by weight; fat: 7% by weight; phospholipids: 16.5% by weight; total cholesterol: 0.06% by weight.

EXAMPLE 3

30 kg liquid propane is passed through 1000 g egg yolk powder (total lipids: 60% by weight; fat: 45% by weight; phospholipids: 15% by weight; total cholesterol: 2.1% by weight) for 2 hours at 60 bar and 45° C. in a 4 1 pressure autoclave. The process is carried out in a circulation in which the extract separation is achieved by evaporation of the propane in a separator. The extraction residue (500 g) was analysed: total lipids: 20% by weight; fat: 3% by weight; phospholipids: 17% by weight; total cholesterol: 0.05% by weight

EXAMPLE 4

15 kg liquid propane is passed through 1000 g whole egg powder (total lipids: 41% by weight; fat: 27% by weight; phospholipids: 14% by weight; total cholesterol: 1.4% by weight) for 1 hour at 40 bar and 35° C. in a 4 1 pressure-autoclave. The process is carried out in a circulation in which the extract separation is achieved by evaporation of the propane in a separator. The extraction residue (683 g) was analysed: total lipids: 14% by weight; fat: 6% by weight; phospholipids: 8% by weight; total cholesterol: 0.03% by weight.

EXAMPLE 5

6 kg liquid propane is passed through 1000 g egg yolk powder (total lipids: 60% by weight; fat: 45% by weight; phospholipids: 15% by weight; total cholesterol: 2.1% by weight) for 35 minutes at 20 bar and 45° C. in a 4 1 pressure autoclave. The process is carried out in a circulation in which the extract separation is achieved by evaporation of the propane in a separator. The extraction residue (550 g) was analysed: total lipids: 28% by weight; fat: 12.5% by weight; phospholipids: 15% by weight; total cholesterol: 0.09% by weight.

We claim:

1. A process for producing an egg-based product in powder form having a reduced fat and cholesterol derivative content, but not a substantially reduced phospholipid content consisting essentially of extracting fat and cholesterol derivatives from a powdered egg based product with liquid propane at a pressure of $\leq 200$ bar and a temperature of $\leq 70°$ C.

2. Process of claim 1, wherein the is from 10 to 60 bar and the temperature is from 20° to 60° C.

3. Process of claim 2, wherein the temperature is from 25° to 50° C.

4. Process of claim 1, wherein from 1 to 30 kg propane is used per kilogram of said egg-based product.

5. Process of claim 1, further consisting essentially of separating said fat and cholesterol derivatives from said liquid propane by evaporation or reducing the pressure of said liquied propane.

6. Process of claim 1, wherein said extraction liquid further consists essentially of a mixture of propane and butane.

7. Process of claim 6, wherein said mixture of propane and butane comprises up to 45% by weight of butane.

8. Process of claim 1, wherein said fat and cholesterol derivative content of said egg-based product is reduced by at least 85%.

* * * * *